United States Patent [19]
Greene

[11] 3,903,741
[45] Sept. 9, 1975

[54] WATER SPEED INDICATING INSTRUMENT

[75] Inventor: Leonard M. Greene, Chappaqua, N.Y.

[73] Assignee: Safe Flight Instrument Corporation, White Plains, N.Y.

[22] Filed: Nov. 12, 1973

[21] Appl. No.: 414,784

[52] U.S. Cl.............................. 73/181; 73/194 EM
[51] Int. Cl............................................. G01c 21/10
[58] Field of Search....................... 73/181, 194 EM

[56] References Cited
UNITED STATES PATENTS

| | | | |
|---|---|---|---|
| 3,759,097 | 9/1973 | Cushing........................ | 73/194 EM |
| 3,777,561 | 12/1973 | Lewis.................................. | 73/181 |

*Primary Examiner*—Donald O. Woodiel
*Attorney, Agent, or Firm*—Edward A. Sokolski

[57] ABSTRACT

In a preferred embodiment, a fluid-flow velocity detector comprising a "Faraday transducer" arrangement adapted to be attached to the underside of a vessel hull (especially as placed within a skeg or like water deflector) being aligned with the vessel's keel so as to detect changes in fluid velocity in the keel direction. Such a transducer is constructed and disposed to present a magnetic flux along a prescribed direction, transverse to flow in the "keel direction", below the hull and spaced significantly therefrom, together with a pair of detector electrodes provided to bracket the intersection of this flux with this flow, so as to detect flow velocity therepast (at least in the keel direction). This detection proceeds according to the Faraday Effect, whereby magnetic flux lines are intercepted by passing "conductive segments" of water, extending between the electrodes and electrically bridging them, so as to originate current induced by this magnetic flux and conduct it to an electrode. This current signal is applied to a velocity indicator, preferably in conjunction with reference signals as a standard for comparison whereby to indicate vessel speed (and, optionally, flow direction).

12 Claims, 15 Drawing Figures

WATER SPEED INDICATING INSTRUMENT

BACKGROUND, FEATURES

This invention relates to fluid motion detection and, more particularly, to an arrangement for accurately and efficiently detecting the movement of a vessel with respect to the liquid (water) medium through which it is moving, doing so with an improved modified structure and with an improved, more effective operation.

PRIOR ART

As workers in the art will recognize, present instrumentation of this type has its problems. Some such instruments involve, simply, propellers. These get fouled all too readily and vary widely in calibration as the typical slime builds up on their surfaces.

Another such instrument involves the use of fragile detector rods projected from the vessel's hull. These tend to get damaged or broken by passing obstructions, or at least to be fouled thereby and thus rendered inoperative all too soon.

Another general class of such instruments involves sensors placed on the hull surface such as transistorized transducers for detecting water-pressure differential. These are too often and too readily affected by the "boundary layer" fluid flow found adjacent to the hull surface of a moving vessel. Also, their sensitivity and calibration are too apt to be upset by the marine organisms and other marine life characteristically clinging to the hull. More particularly, it has been found that detecting water speed too close to the surface of a moving hull is apt to be quite unrepresentative of vessel speed, indicating merely the speed of the boundary layer (e.g. which being more laminar, may well have a speed and direction not truly representative of the relative motion between the overall vessel and the bulk of the water medium. Moreover, the effect of this boundary layer tends to change as its "sheathing" of marine organisms develops and grows.

Of course, any of the above sensors can involve external electrical contacts on the vessel hull which are exposed to the water medium and will typically suffer in effectiveness and accuracy as slime and other marine encrustations build up on them. A particular form of these sensors involves transducers which characteristically exhibit such a weak detection output that interference from any one of a number of common sources in the marine environment degrades their effectiveness and accuracy far too readily.

The present invention provides an answer to the foregoing and other difficulties, avoiding propellers, fragile elongate projections, weak transducers and external sensors disturbed by boundary-layer conditions and/or by marine life encrustations.

Thus, the present invention involves detecting flow velocity with a Faraday transducer, by projecting a magnetic field well into the passing liquid and transverse thereto, such as to induce a current signal in the liquid, and also in presenting a pair of electrodes so as to bracket this magnetic flux and pick up this current signal; and then processing the signal as an indication of flow velocity. In particular, it involves projecting this magnetic flux well away from containment walls and well into the flow path, as well as shielding the conduction path away from the pick-up electrodes, especially by introducing a central coaxial lead down through a rotating magnet shaft means therefor.

Thus, it is a principal object of this invention to provide such an improved flow velocity detector and to thus provide the features and advantages described. A more particular object is to provide such a detector wherein a magnetic field is rotated and is projected well beyond boundary layer fluid flow and beyond any other phenomena associated with fluid directing surfaces.

Yet a further object is to provide such a detector which is mechanically and electrically symmetrical so as to produce a balanced composite (preferably) output signal with a minimum of spurious components. Still a further object is to provide such a detector wherein a coaxial conductor is provided down through magnet mounting means to a distal pick-up electrode to eliminate unwanted signals caused by the rotating magnet means. A further object is to provide such a detector housed in a flow-diverting body adapted to initiate higher flow velocity therepast and thus "amplify" the detected output signals.

Yet a further object is to provide such a detector with the body thereof constructed so as to maximize the short circuit path through the liquid medium and thus minimize inter-electrode current leakage. A further object is to provide such a detector including an integral reference signal generator for synchronous, phase-sensitive demodulation of the flow-velocity signal. Other objects and features and advantages will become more apparent upon consideration of the following description of preferred embodiments of the invention taken in conjunction with the associated drawings wherein:

FIGS. 1 and 1A show, quite diagrammatically, a sailboat in side and (fragmentary) end elevation views, respectively, and exemplify a preferred embodiment for installing and using a flow velocity detector embodiment, according to the invention;

FIGS. 2A and 2B show in side elevation and bottom plan view, respectively, a preferred flow velocity detector embodiment as installed in a boat hull of the type shown in FIGS. 1 and 1A, with FIG. 2C showing a section through the electrical connector of FIGS. 2A;

FIG. 3A shows a cross-sectional schematic enlarged side elevation of the embodiment of FIG. 2, while FIG. 3B shows a cross-section therethrough and FIG. 9 depicts typical, idealized electrical output signals therefrom;

FIG. 7 shows, in very conceptualized, schematic side elevational view, the active conductor elements and associated electrical output of the combination in FIG. 4A.

It is, of course, known that a magnetic field may be projected into a moving conductive liquid medium such as to induce electrical current in the medium which can be detected by electrodes properly disposed in the liquid. Of course, the field, conductors and fluid flow must be properly disposed relative to one another to derive a current signal representing relative motion between the medium and the detection instrument. The foregoing will be understood as the Faraday Effect, and the instrument known as a Faraday transducer, with the conductive-liquid segments bridging such electrodes being understood as Faraday paths or "liquifors".

It is further known that if such a magnetic field is oscillated (alternated), then current so generated in the liquid medium will be less problematical to detect and manipulate, both in terms of galvanic deterioration of the sensing instrument elements, as well as in processing of output signals. More particularly, it has been seen in conventional devices that an instrument employing this Faraday Effect may be used with magnetic fields alternating at frequencies of several hundred cycles per second (cps) whereby the mode of liquid flow relative to the instrument may be effectively determined with "state of the art" output means, However, in such prior art instruments, a good deal of detection power is required and the detection is not particularly efficient in terms of power usage. It is an object of this invention to provide an answer to such problems and shortcomings.

Figure 2:
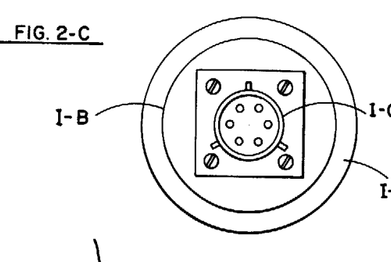

It has appeared feasible to provide such an alternating Faraday field by rotating one, or several, magnetic field generators; especially using a rotated permanent bar magnet to provide an inexpensive source of flux without requiring application of external power (see FIGS. 2, 3). Of course, one version that comes to mind is to simply use a simple, familiar "gapped-ring" (horseshoe) magnet, disposing a pair of pole pieces adjacent the path of the moving fluid (e.g. so the pole pieces lie close to the plane of a boat hull — see FIGS. 8, 8A). This will project a discontinuous magnetic flux circuit (loop) projecting into the fluid path reentrantly. A knotmeter might be provided with such a design, placing conductors threaded near and around the magnetic elements and/or around one or both of the electrodes (see FIG. 8); however, this can too readily interfere with the magnetic field and with the output current signal. Other difficulties, such as those associated with boundary layer anomalies, will be perceived by workers in this art using such as "shallow" flux configuration. That is, the magnetic circuit will not project far enough and extend sufficiently beyond the vessel hull and associated boundary layer of flow to afford accurate velocity detection.

The present invention is adapted to provide an answer to the foregoing difficulties, especially as implemented with such a Faraday transducer for velocity detection wherein an alternating magnetic field is projected out from a hull surface, well beyond any boundary layer and related surface projections to present a relatively complete, continuous magnetic flux circuit transverse to the plane of expected (principal) liquid flow.

Other features and advantages will be apparent to those skilled in the art upon contemplation of the subject disclosure as falling within the purview of the subject claims. The present embodiment is included principally for illustrative purposes to enable those skilled in the art to make and use the invention and practice a preferred embodiment thereof. Some of the novel features that will occur are as follows:

1. A speed sensor using a magnetic field that is projected well into the path of the passing conductive liquid but transverse thereto, situated primarily in a plane which is parallel to the mounting (hull) surface, but transverse this path.

2. Such a sensor wherein this magnetic field is rotated.

3. A speed sensor whose body (pickup electrodes) and magnetic field extend well into the liquid flow-path, sufficient to minimize surface effects, such as from boundary layer flow near the attaching body and from marine growth on the surface.

4. A speed sensor adapted to be so projected into the flow stream as to provide a stronger magnetic field and associated induced current in the water, thereby greatly increasing sensitivity and enhancing output signal strength.

5. A speed sensor which is mechanically and electrically symmetrical so that the composite output signal generation will be "balanced", with minimal spurious signal components.

6. Such a sensor wherein coaxial conductors are provided down through a central, distal electrode to eliminate unwanted signals, generated by the rotating magnet.

7. Such a sensor wherein a cylindrical transducer body and/or housing such as to effect a higher flow velocity through the magnetic field, resulting in a stronger output signal.

8. Such a sensor wherein the body is constructed so as to maximize the length of the signal short circuit path (through liquid medium), and so provide low-leakage between electrodes.

9. Such a sensor wherein the body is shaped to minimize the collection of marine debris such as sea weed.

10. Such a sensor wherein is provided an integral reference signal generator for synchronous, phase-sensitive demodulation of the flow velocity signal.

PREFERRED EMBODIMENT

Figure 3A:
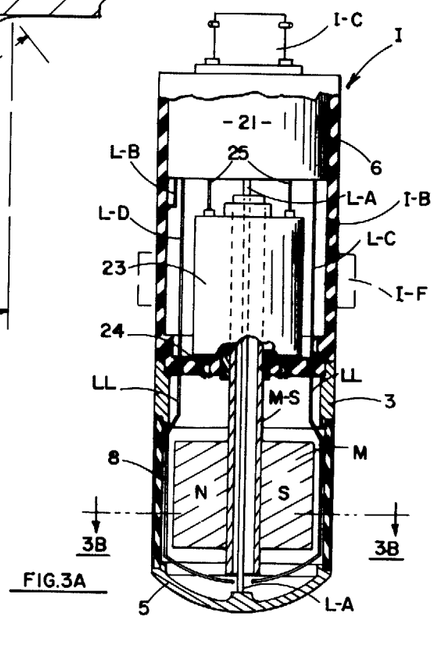

FIG. 3A shows a preferred embodiment of a water velocity detector instrument (knotmeter) according to the invention, while reference to FIGS. 1 and 2 will serve to indicate the typical context for installation and use of such an instrument.

Figures 1A, 1B, 2B:
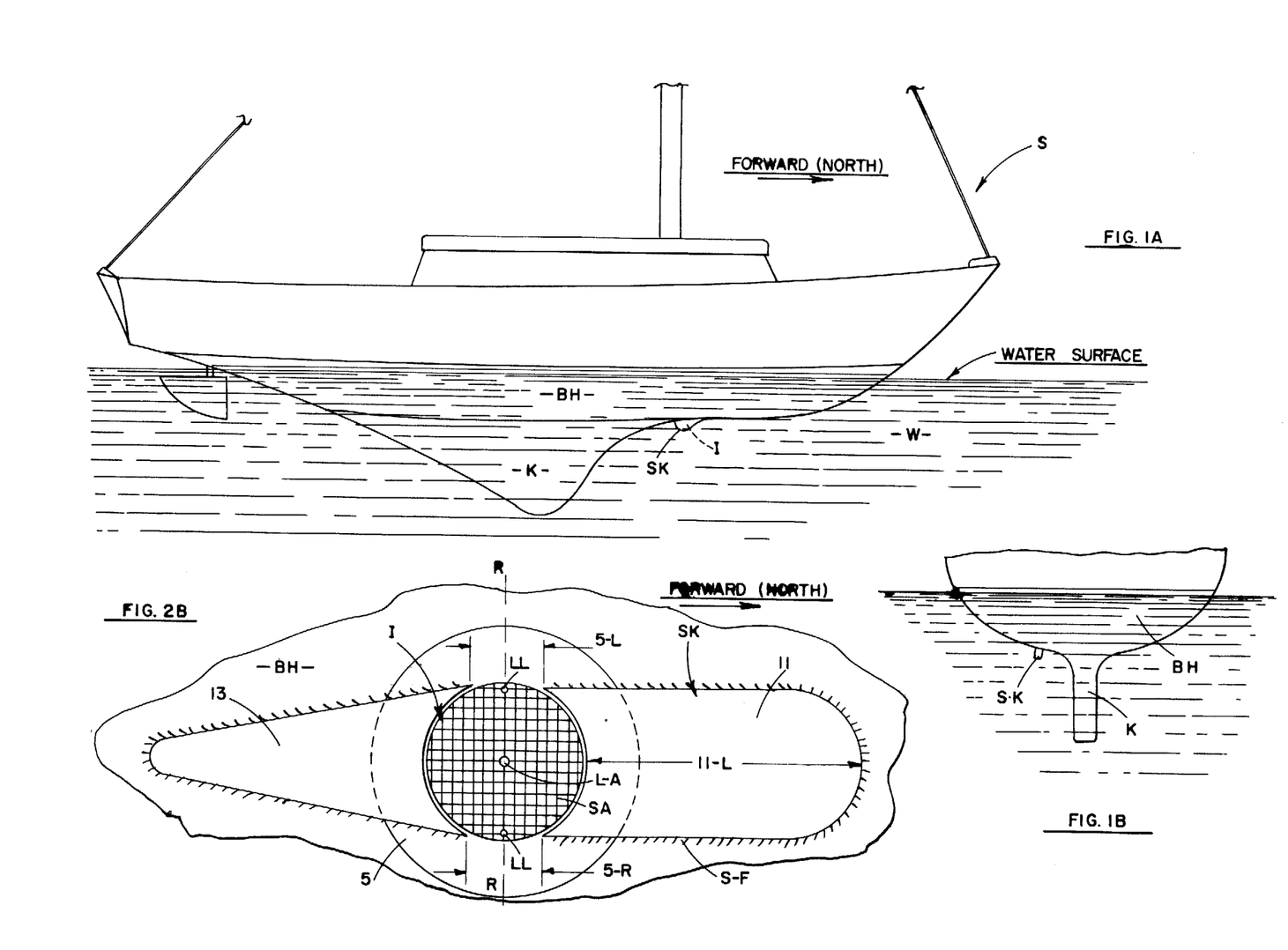

Thus, in FIG. 1A there is shown a sailboat-type vessel S, with a typical floating disposition in a sea water medium W. Vessel S has a portion of its underhull BH and associated depending keel K floating in the water with the knotmeter embodiment I mounted in a projecting skeg structure SK. Meter I is adapted, as further explained below, to detect the relative speed of sailboat S with respect to water W through which it is moving, at least along the axis of keel K ("keel velocity").

In alternate embodiments, directional components may also be detected according to variant embodiments and thus adapted to indicate true, net vessel velocity, but keel velocity is sufficient here and in many cases. As better seen in FIGS. 2A and 2B, skeg SK and instrument I housed therein are so disposed on the underside hull BH as to always be immersed in the water medium (e.g. no matter how far sailboat S has heeled-over) so as to detect the relative motion between water W and vessel S at all times. Skeg SK will be recognized as provided to house and protect detector I, as well as to provide a streamlined, increased-velocity fluid flow past opposing sides of instrument I (especially past lateral reference plane R—R of the instrument, this plane to be disposed relatively transverse to the longitudinal axial (keel) of sailboat S — here indicated as a line along the "north" direction or point). As well understood in the art, and further discussed below, skeg SK is generally adapted to provide a streamlined fluid flow of increased velocity in a relatively laminar, low-turbulence mode past reference plane R—R, although in given instances it may be dispensed with and instrument I projected alone — preferably streamlined itself — from hull BH. Of course, skeg SK also serves to protect all the detection portions of instrument I insofar as it projects from the hull BH. A forward portion SK-F and complementary aft portion SK-A make up skeg SK and are adapted as and designed as known in the art to provide the desired "streamlined" liquid flow (at the contemplated velocities), aft portion SK-A being conventionally fashioned to minimize cavitation. A fillet S-f is provided along the junction between skeg SK and hull BH for water-tight incorporation. Of course, for simplicity, attaching parts, seals and other conventional elements are not shown, although they will be well understood by those skilled in the art.

Figure 6:
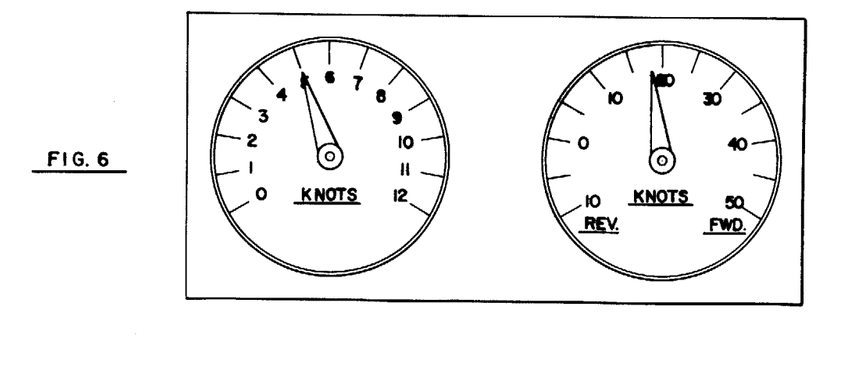
FIG. 6 indicates schematically a pair of "knotmeter" indicators of the type adapted for use with this embodiment.

More particularly, as best seen in FIGS. 2A and 3A, instrument I comprises an elongate, relatively cylindrical transducer body I-B mounted in the sailboat S to project from the selected portion of hull BH to present a pair of upper and lower "pole electrodes", 3, 5, respectively, out a suitable through-hull fitting, well beyond the confines of the boat hull BH and into surface communication with the water medium W so that Faraday effect induced current may be picked up thereby. More particularly, a noncorrosive (e.g. bronze) mounting flange I-f is provided to effectively position and seal instrument I-B in the prescribed position disposed between forward and aft skeg portions, SK-F, SK-A, with upper pole 3 projecting just beyond the surface of the hull BH (and constituting the "proximate electrode") and the "distal", or lower, electrode 5 projected below and beyond the confines of skeg SK to be in working contact with the passing water medium as further described below. A connector portion I-c is provided to conduct input and output signals to and from instrument I, as further discussed below, whereby to afford communication with energizing power means and indicator output means, as well known in the art. Typically, the boat hull BH will be comprised of non-magnetic material, such as wood, fiberglas, other plastic, etc., with a minimum of metallic screws, bolts or other metal joining means adjacent the instrument I although the detector might be used with a metal hull in some instances, given some surrounding dielectric. Skeg portions SK-F, SK-A will comprise a suitable copatible nonconductive, nonmagnetic material, such as fiberglas, fashioned and fastened by techniques known in the art and not germane to this description. Electrodes 3, 5 may comprise conductive bronze. For example, detector I may comprise an instrument body I-B on the order of several inches long and about two inches in diameter; such as to project distal electrode 5 about 2 inches out from the hull with skeg SK projecting about the same distance and being streamlined, conventionally, around the instrument. The instrument housing also preferably is adapted to be relatively "self-contained", including the electronics package 21 adapted to convert the AC transducer signal into a DC output signal (e.g. adapted to drive the pointer movement on a knotmeter, as seen in FIG. 6).

Figures 2, 3B:
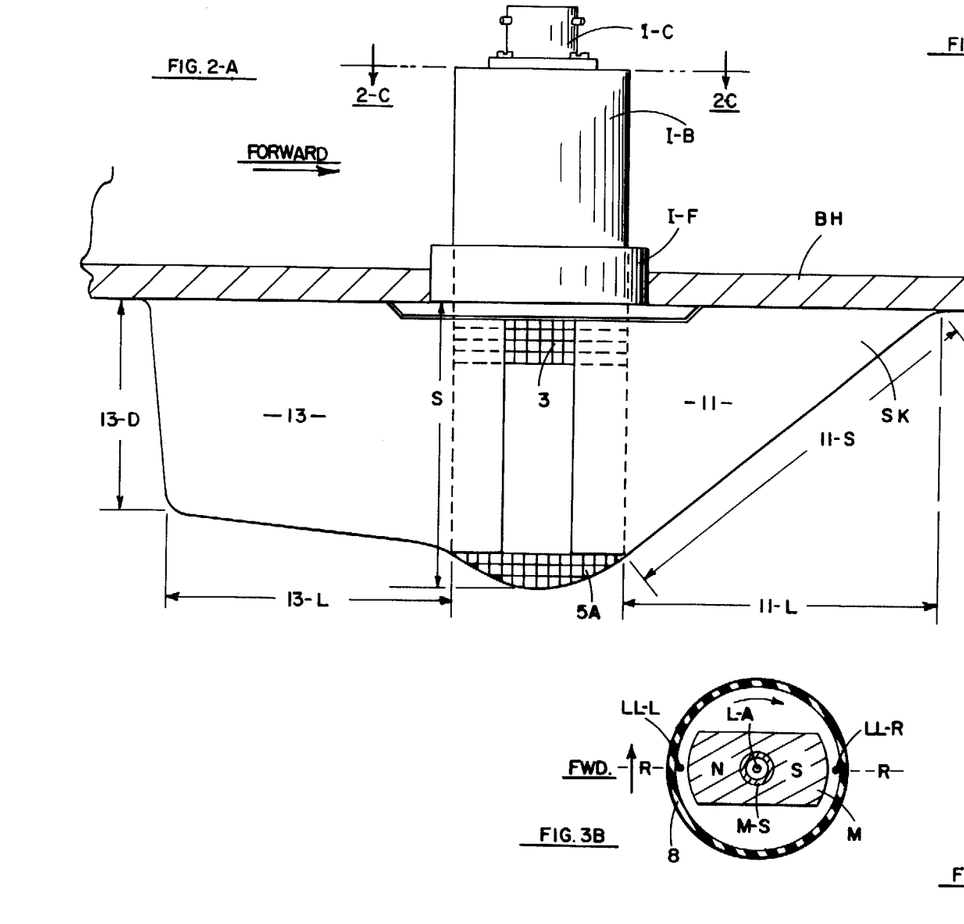

More particularly, referring to FIGS. 3A and 3B, body I-B comprises upper and lower (inner and outer) insulative tubular portions 6, 8, respectively, joined by an intermediate conductive electrode ring 3, the body terminating at its distal end with the semi-spherical conductive cap, of distal electrode 5 (preferably "domed" for streamlined flow), both electrodes being comprised of copper, marine bronze or other conductive metal compatible with the marine environment (being noncorrosive, etc.). A motor 23 is mounted within body I-B on a suitable annular mounting bracket 24 attached to body I-B along the inner intermediate portion thereof just above ring electrode 3. Motor 23 is disposed to preferably occupy the "inner" portion of instrument I within the vessel hull and is adapted to be energized and controlled conventionally through a pair of motor leads 25, being energized from a power source housed within the vessel. An output shaft M-s is mounted rotatably in motor 23 and bracket 24 and adapted to be rotated in a prescribed manner upon energization of motor 23 (selectably variable angular frequency, etc.). A relatively rectangular cross section "bar magnet" M is provided and adapted to be suitably affixed adjacent the distal end of shaft M-s to be rotated thereby and includes a central hollow aperture for shaft M-s and suitable coupling means (not shown). Thus, motor 23, magnet M and the associated elements are adapted to be housed within casing I-B so as to be in contact only with bracket 24. Magnet M is preferably comprised of ferromagnetic material and of a mass (here about 1 inch × 1 inch × ½ inch) sufficient to provide adequate flux and Faraday current. Insulator section 8 should preferably comprise a good electrical insulator, as well as a relatively nonmagnetic, highly permeable material, relatively transparent to the flux from the magnet M within.

Figure 4A:
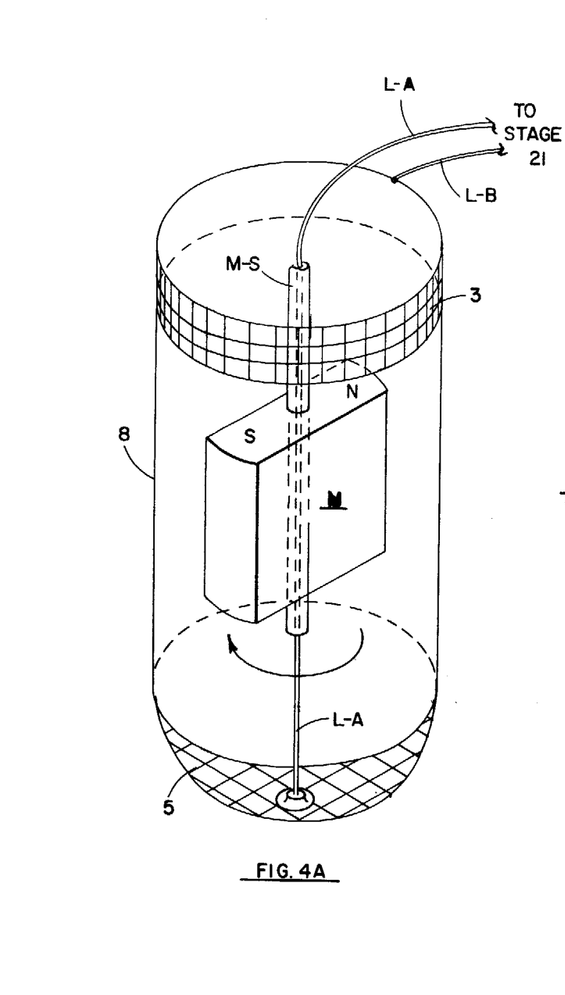
FIGS. 4A and 4B show side elevational, very schematic views of the magneto-electric elements of the embodiment in FIG. 3, particularly indicating the flow signal and reference signal pick-up arrangements, respectively.
Figure 4B:
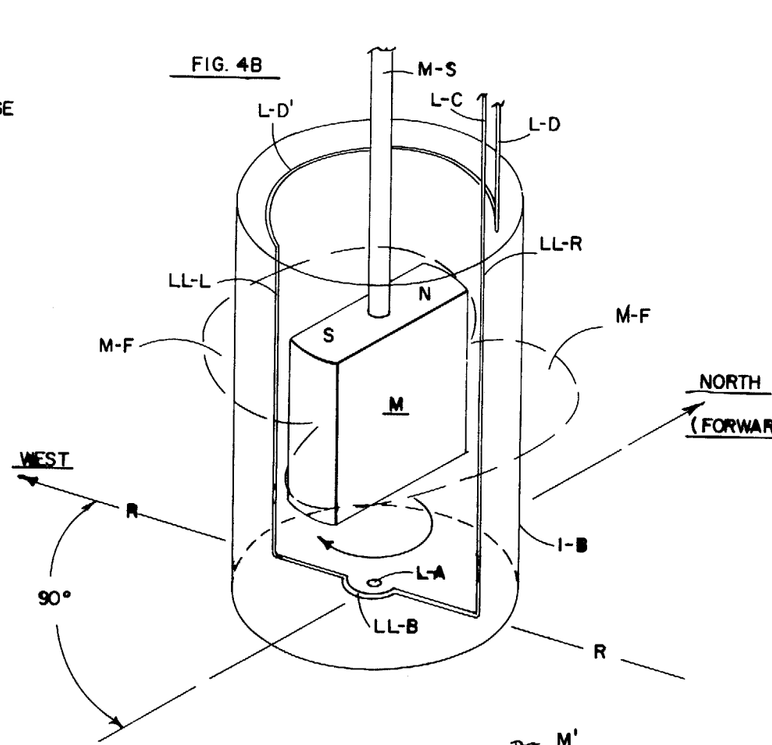

As best seen in FIGS. 3A, 3B and 4B, the aforementioned rotatable "permanent" magnet arrangement is, in turn, adapted to be effectively enclosed within a "reference coil", or pick-up wire loop, LL, disposed to be aligned along aforementioned reference plane R—R (transverse to the boat's keel), this comprising a copper wire or like conductor, disposed in the vicinity of the magnet flux and led out of instrument I through a pair of spaced output conductors L-C, L-D, communicating with the right and left portions of loop LL (LL-R, LL-L, respectively — see FIG. 4B). In addition, a second pair of output conductors L-A, L-B are provided to be in ohmic contact with pole electrodes 5, 3, respectively. More particularly and according to a particular feature of this invention, distal lead L-A is introduced from the proximate end of instrument I down through the hollow magnet shaft M-s to be terminated at, and connected to, distal pole 5, at the center thereof. L-A will, according to this feature, be well disposed mechanically as well as well shielded electrically — e.g. from interfering flux, RF, etc.; and may preferably be covered with coaxial or like shielding means. A cross-connection, including a loop LL-b circumventing the connection between L-A and pole 5, is coupled between the opposed sections of loop LL at the distal end of instrument I as well (see FIG. 4B). The other pole lead L-B is coupled to its respective pole electrode 3 along the inner portion of insulator body 6 in a conventional manner (see FIG. 3A).

Thus, it will be apparent that rotating magnet M and the associated magnetic field (flux M-F) extending therefrom (see FIG. 4B especially) can invoke the Faraday effect. Now, with reference loop LL and its associated conductors so disposed; and with pole conductors 3, 5 so arranged on contact with passing fluid, it will be apparent to those skilled in the art that a novel innovative combination is provided whereby Faraday current to the electrodes can be detected as an indication of fluid velocity. That is, the rotating alternating magnetic flux provided in conjunction with a reference pair of conductor pole electrodes can conduct Faraday effect current from the flowing conductive liquid in a manner offering minimal interference between the subject magnetic field and electrical conduction paths, as well as providing a maximized output signal strength, as further discussed below.

More particularly, and with reference to FIGS. 1 and 2 as well as FIGS. 3 and 4, it will be apparent that with permanent magnet M so rotated, magnetic flux M-F will be rotated 360° at a prescribed frequency and will intersect reference plane R—R and loop LL twice each revolution, and thus produce a "reference signal" output from loop LL (see wave form 9-D), as well as a "water velocity" signal output from pole electrodes 3, 5 as further described below (see wave form 9-A). With this magnetic flux M-F being so swept around, the conductive liquid segments between poles 3, 5 can be expected to each receive an (opposing) induced Faraday effect current, along the opposing lateral portions thereof extending adjacent the reference plane R—R (see FIGS. 2B, 4A and 7). That is, as seen best in FIG. 7, the water between pole electrodes 3, 5, and along plane R—R is considered (only for purposes of explanation) as forming opposing pairs of liquid conductors, or liquifors, P-1, P-2. These will be understood as carried in the direction indicated with the liquid flow (by virtue of sailboat S moving through water medium W at a prescribed velocity) — for illustration purposes understand this motion as being "purely-north". With one such liquifor on each side of the pole electrodes 3, 5 and connected in parallel therebetween, there will, in effect, be created a "two-pole", electric generator, so connected that its output is zero (a "null"). The voltages generated (induced by Faraday Effect) in liquifors P-1, P-2 are, of course, caused by their passing through (at right angles with) the rotating magnetic flux.

Now, if the magnet were held stationary with its poles extending along reference plane R—R and transverse to the flow of the water (assumed "Northward", with the sailboat and instrument I being moved North through the water), these liquifors P-1, P-2 will be seen to cut the flux lines MF and generate a Faraday voltage during this passage much in the manner of an electric generator. Electrodes 3, 5 are so connected that the polarity of the voltage in each liquifor is such that the electric current to the electrodes adds up and presents a summed output signal. FIG. 9A, by comparison, shows the typical, idealized output when the magnet is turning and the instrument moving relative to the liquid. Output amplitude will be proportional to the relative speed (between the liquid and the instrument — closely analogous to the number of liquifor "wires" passing through the magnetic field per second).

Figures 7, 8A, 9:
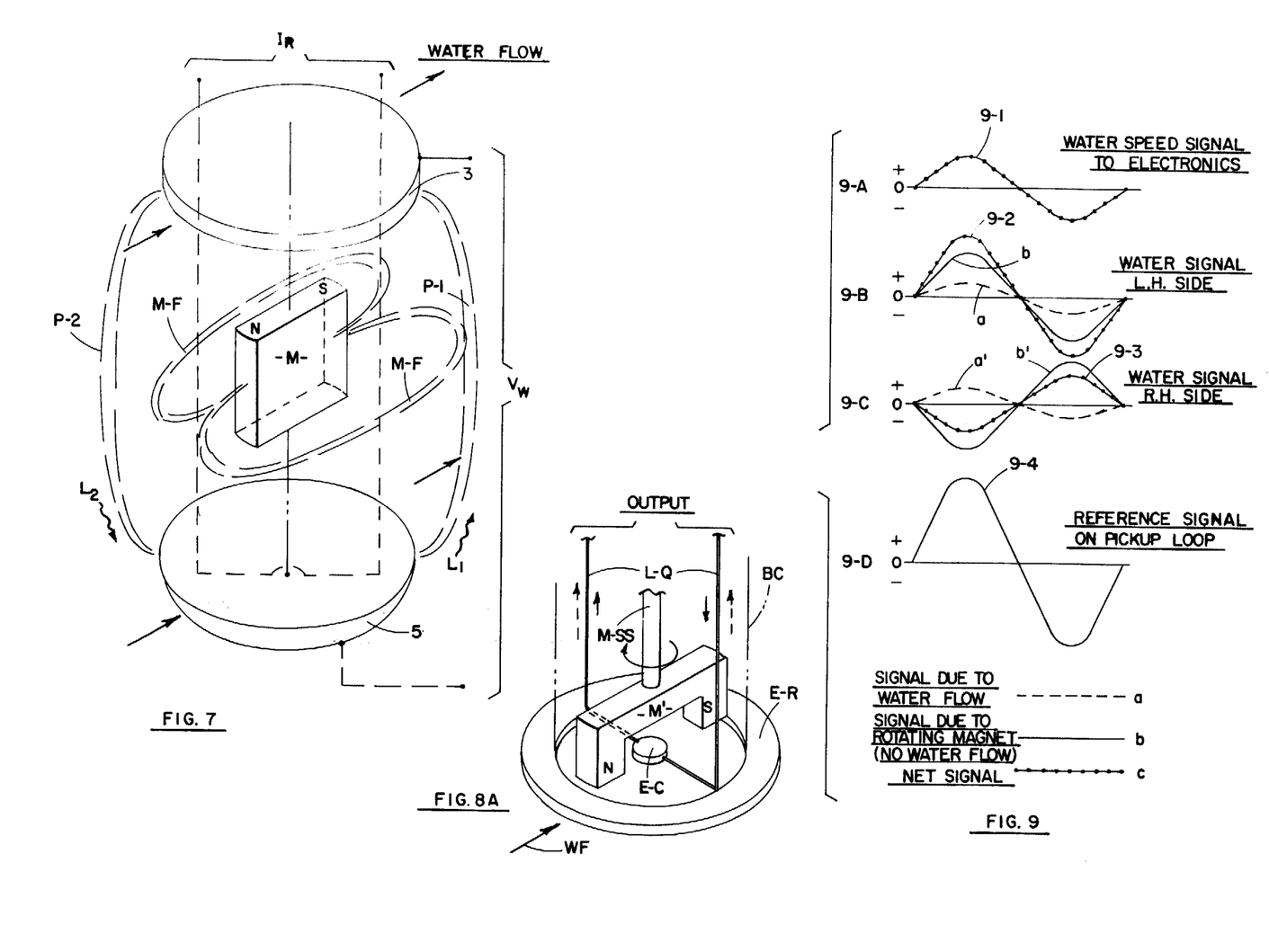

It will be apparent if magnet M is rotated (and water flow is ignored) a sinusoidal output signal will be generated, as indicated in curves $b$ in FIG. 9. Rotating magnet M and deriving this AC signal has the advantages of (1) eliminating electrolysis which will tend to corrode electrodes 3, 5; (2) eliminating a large error signal due to the "battery action" of the metal electrodes 3, 5 in the fluid; (3) eliminating errors due to DC currents in the liquid medium W; and (4) allowing AC amplification of the (low-level) transducer output signal (from poles 3, 5) which results in more gain stability. In general, by using AC output, it will be recognized as much easier to filter-out unwanted signals.

With this embodiment, it will be found in practice that fluid velocity output is unusually strong. For instance, in FIG. 9, various plottings of (idealized) output signals for various conditions are shown with one cycle being illustrated very schematically in each case — the signal due to the rotating magnet alone being indicated, along with that added by water flow and the resultant also indicated. Curve 9-1 (FIG. 9A) will be understood as illustrating a typical output indicating the net "water speed" signal applied from (left and right) electrodes 3, 5 to electronics stage 21 (for mixing, amplification, etc., as known in the art and discussed below). Curve 9-3 will be understood as an isolated signal taken for one cycle and only on the "right" side (see "exposed" right side of bottom pole electrode 5 along section 5-r in FIG. 2B; similarly, arcuate liquifor segment P-1 in FIG. 7). Adding the "magnet-only" output ($b'$) to that derived from water flow ($a'$) algebraically yields signal 9-3. Similarly for curve 9-2 on the left. It will be apparent that the amplitudes (positive-going and negative-going) of sinusoidal signals 9-2, 9-3 may be added algebraically to yield the overall flow velocity signal 9-1.

Comparing left and right signals 9-3, 9-2, it will be apparent that they are quite similar and of opposite magnitude (in respect of time), this deriving from the careful symmetry of the transducer construction according to the invention. It will be observed that the inequality of signals 9-2, 9-3 is due to the fact that the "dynamic" output (defined above as caused by liquid flow — curves $a$) is "helped" by fluid velocity on one (e.g. right) side and hindered thereby on the other (e.g. left). For instance, in FIG. 7, the Northward moving right segment P-1 will presumably move opposite the flux-rotation and cut a first group of magnetic flux lines, as helped by the liquid flow; whereas the opposite liquifor P-2, also proceeding Northward, will cut similarly-directed flux lines and, being thrust "with the flux" by liquid flow, will cut fewer per second than P-1. Presumably, one current signal will be directed to distal electrode 5 and up lead L-A to electronics stage 21, while the other induced current from the opposing liquifor will provide an oppositely-directed current pulse to thus be applied to the near electrode 3, and beyond, along lead L-B to stage 21, both positive-going signals being summed, for instance, over a one cycle period.

It will, from the above, be accordingly appreciated how useful and important it is to provide good perfect symmetry of these elements in the detector instrument. More important, it should also be appreciated how this construction tends to project the magnetic field well out into the true liquid flow and away from the supporting hull for larger, more representative knotmeter readings. It will also be appreciated how this construction serves to shield the distal electrode lead from interference. Workers in the art will recognize that, as compared with prior art designs, the subject embodiment is not as susceptible to interference tending to cause read-out errors and doesn't conduct and radiate interference radiation.

Curve 9-4 (FIG. 9D) indicates the reference output signal for one exemplary cycle. This signal will be understood as emanating from pick-up loop LL-L, being conducted out associated leads L-C, L-D, to be applied to mixing stage 21, as described below (with respect to the circuit in FIG. 5).

Using a bar magnet of Alnico V for magnet M, about one-half inch in diameter and 2⅝ inches long, and about 90 percent saturated, rotated at from 1500 to 2000 rpm, yields an output of approximately 1 millivolt per knot (peak to peak). Such operation may be conducted, quite conveniently, using readily available power — such as a 12-volt nominal power supply, drawing a few hundred mA., with power dissipation of a few (e.g. 2) watts. (Typical signal strength at the magnet pick-up with no amplification at all would be on the order of 0.7 millivolts per knot). Such an output will be recognized as providing the capability of high signal/-noise ratio and a much stronger signal, primarily because, with the mentioned construction projecting the magnetic field as indicated, relatively all the magnetic flux (not just a small fraction of it, as in the prior art) is put to use for detecting liquifor current. Of course, a stronger magnetic field may be desired with such construction to compensate the longer (low-leakage) reluctance path it establishes through the water. It will be recognized that use of such a permanent magnet requires less power and yet can maintain a strong magnetic flux, while avoiding the problem of introducing forces tending to demagnetize the source. (Electromagnets in the prior art have introduced such problems.) Of course, alternative forms of magnets may lend themselves to the invention features, in place of the bar magnet shown; for instance, a disc magnet or other conventional forms may be used, as single polepair or multiple pole pairs.

OUTPUT, PROCESSING

Figure 5:
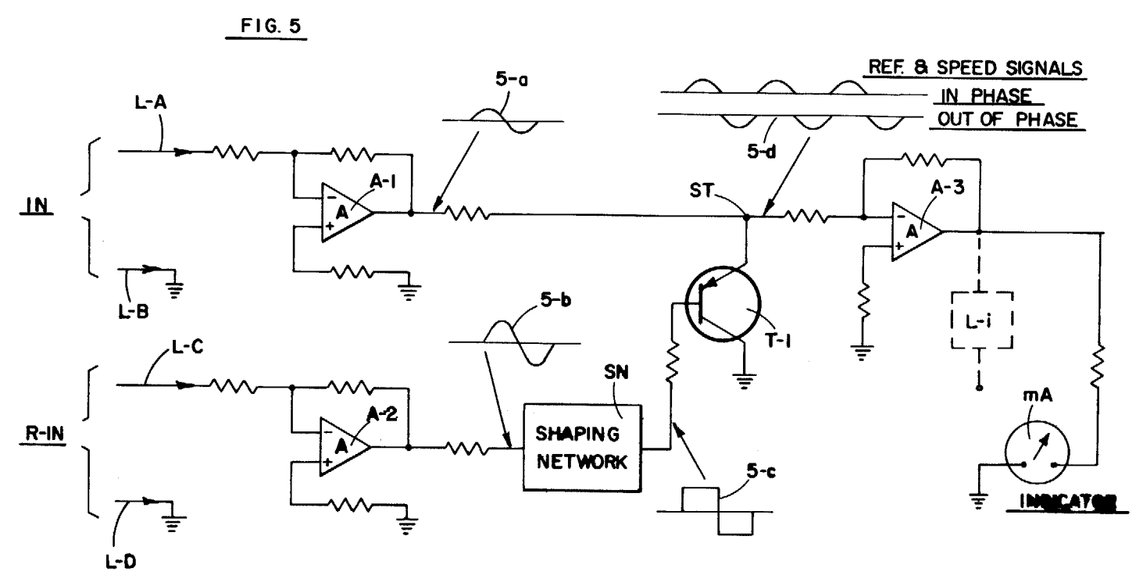
FIG. 5 illustrates a schematic circuit diagram of the type apt for use with the above embodiment (FIG. 9 indicating idealized simple output signals as mentioned)

Turning to FIG. 5, an electronic circuit for combining, amplifying and processing the detector output signals is illustrated. Such a circuit is apt for operation with the aforedescribed detection embodiment, although it may be modified, or substituted for, as workers in the art will readily recognize. Some elements are quite conventional and thus only suggestively indicated here.

Thus, leads L-A, L-B from the liquifor output and associated pole electrodes 5, 3 respectively, are arranged to apply the "fluid flow" (current) signals ("IN") to an amplifier stage A-1. The output of A-1 is applied to switching terminal ST and will generally take the form indicated by representative wave form "5-a". In parallel fashion, the reference signal input (from loop LL-L) is applied via leads L-C, L-D to the input of an associated amplifier stage A-2, the output of which is applied to a shaping network SN and generally takes the form of representative wave form "5-b". Shaping network SN will, as workers in the art readily understand, serve to "square" this output, as indicated by representative wave form "5-c" and apply it, through a load impedance, to the base of a switching (PNP) transistor T-1 (or like switching stage). T-1 functions as a synchronous switch adapted to "gate" the fluid flow signals (5-a), or portions thereof, to an output amplifier stage A-3, through a suitable conditioning impedance. The output of A-3 is applied, through suitable load impedance, to the indicator (here, DC milliammeter mA). As workers in the art will readily understand, the output through ammeter mA may be read-off, suitably scaled, on one or several knotmeter dials, such as indicated in FIG. 6 (high and low scale shown here — provided by suitable scaling impedance, not shown, but well understood in the art). Alternatively, another suitable indicator of speed may read-out the ultimate current signals (e.g. instead of such analog means, a suitable digital indicator means may be provided). It will be apparent that, functionally speaking, the general object is to mix and sum the liquifor output and sample it as related to some reference plane (here, R—R), via the output from reference loop LL-1 to activate the "sampling trigger".

Summarizing this output processing, the AC speed signal after amplification (output 5-a at terminal ST) is demodulated by phase reference AC signal 5-c, this being generated by loop LL-L (the two wires aligned at right angles to the direction of water flow; see FIG. 2). Rotating magnet M will, as mentioned, generate a reference signal in this single turn coil generator LL-L (see FIG. 4B). This signal is in phase with the liquifor signals 5-a for one direction of flow and is 180° out of phase for the other flow direction. This signal is amplified and shaped, as indicated, to operate synchronous transistor switch T-1 which controls the portion of the liquifor signal allowed to reach output amplifier A-3, a signal comprising a chain of pulses (either negative-going or positive-going, depending upon the direction of flow and having an amplitude determined by the speed of flow). The average value and polarity of the pulsed signal determines the deflection of the speed indicator mA, of course, as known in the art.

The demodulation, amplification and indication details shown here in the circuit in FIG. 5 are only one example of a speed system suitable for use with a Faraday-type knotmeter instrument according to the invention. By known techniques, phase shifting of the reference signals can yield one, or several, reference signals, and so-gated fluid flow signals at different phases of operation, and thus indicate flow in other different directions. The desired results may be obtained in many ways; therefore, this example is to be understood as illustrative, but not limiting. As workers in the art will certainly recognize, the supplemental output arrangements may also be provided, such as the typical log recorder (counter to track cumulative knots travelled, integrating the indicated speed as a function of elapsed time), indicated in phantom at stage L-i.

Figure 8:
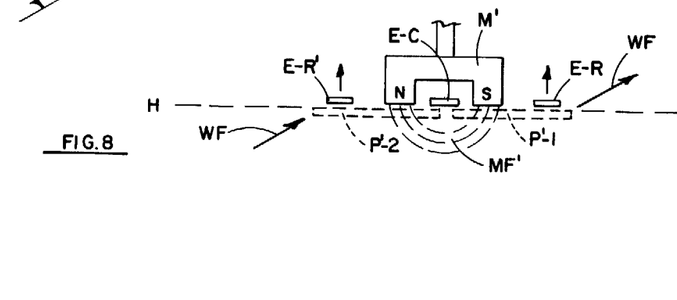
FIG. 8 is a very schematic showing after the manner of FIG. 4B of an alternate embodiment with portions shown in Section in FIG. 8A.

In contemplating a Faraday-type knotmeter of the type indicated in this embodiment, it would appear that one might alternatively direct the magnetic Faraday field normal to the mounting hull, rather than parallel to it, as in the embodiment. Such an arrangment is depicted in FIGS. 8 and 8A, where a horseshoe magnet M' is indicated as so directing its magnetic flux MF' out from the mounting hull (plane H—H indicated in phantom) and relatively normal thereto and through the confines of the associated passing conductive liquid — indicated very schematically by liquifor segments P'-1, P'-2, intersecting the flux lines MF'. Analogous to the prior embodiment, a central electrode E-C is provided, together with associated insulated leads L-Q (in brass casing BC), as well as an outboard ring electrode E-R, together with suitable associated conductors. If one assumes that magnet M' is not moving and that the liquifor segments are moving transverse to the magnetic flux MF' (direction of arrows WF), and the output is terminated, it will be understood a Faraday current will be induced to flow from center electrode E-C to ring electrodes E-R, E-R' on both sides (or vice versa, depending upon the direction of liquid flow) and along the liquifor segments P'-1, P'-2. It will be apparent that the strength of this Faraday current will depend very closely upon how close this segment is to the surface of hull H—H, since with such a horseshoe magnet the flux density is a great deal higher across the short-circuit path (shorter than that of the embodiment) between the closest edges of the pole feet, as well known in the art.

When magnet M' is rotated (shaft M-SS), such Faraday current will circulate around the E-R, E-R' loop. Both sides of the loop should be exactly symmetrical so no differential voltage will be generated and added (in series) to the liquifor output.

By comparison, the embodiments of FIGS. 2 and 3 will be observed to provide sensing magnetic flux which is parallel to the hull, not normal to it, and spaced a distance therefrom. This, of course, will provide a short circuit flux path which is longer than that indicated in the arrangement in FIG. 8 and a path having greater reluctance (magnetic impedance) and thus require a stronger magnet. However, advantageously this flux will be projected out well beyond the hull and the adjacent boundary layer of fluid flow and presumably provide a better indication of the relative speed between the hull and the overall water mass. As workers in the art can well appreciate, such a Faraday effect speed indicator may also be modified to indicate a plurality of such liquifor signal outputs, rather than the single output described above — doing so preferably through a single instrument of the type described (and common detection electronics may also be employed as known in the art).

Further, workers in the art will recognize that such Faraday effect detection of liquid flow speed relative to a fixed point (i.e., with rotating permanent-magnet field, associated reference loops and detector electrodes, plus associated detection circuitry and indicator means) can be otherwise implemented. Alternate applications will also come to mind such as detection of flow down a conduit (e.g. an oil pipeline).

While this invention has been particularly described and illustrated herein with reference to its use in and for a particular arrangement of elements and associated techniques and for a particular purpose, it will be clear that the subject features and techniques can be advantageously employed, individually or cumulatively, in combination with other related equipment, for analogous purposes. Obviously equivalent parts and materials and techniques may be employed, separately or cumulatively, within the spirit and scope of the invention as defined in the appended claims.

What is claimed is:

1. A Faraday transducer adapted for mounting on a reference surface so as to generate signals representing the velocity of fluid flow past said surface comprising
a housing,
a permanent magnet rotatably mounted in said housing at a position therein between opposite ends thereof, the magnet poles being positioned on opposite sides of the magnet rotation axis,
means for rotatably driving said magnet to generate alternating magnetic flux out from the reference surface into the fluid flow and beyond the region of boundary layer and related surface effects,
a pair of detector electrodes spaced apart from each other, said electrodes being mounted in said housing along an extension of the magnet rotation axis on opposite ends of said magnet so as to bracket the magnetic flux, thereby conducting Faraday current signals, and
signal translation means for receiving said Faraday current signals from said electrodes and processing said signals so as to provide said fluid flow signals.

2. A Faraday transducer arrangement adapted for mounting on a prescribed reference surface so as to generate fluid flow signals representative of the velocity of fluid flowing past this surface, this transducer comprising, in combination;
magnetic field generating means arranged to project a prescribed magnetic flux well out from the mounting surface into said fluid flow and beyond the region of boundary layer and related surface effects;
a pair of detector electrodes disposed to be projected into said fluid, being projected outwardly normal from said surface and spaced apart a prescribed isolation distance adapted to minimize leakage therebetween, being disposed so as to bracket said magnetic flux whereby to intercept and conduct away Faraday current signals;
said magnetic field generating means comprising hollow shaft means, a permanent magnet mounted for rotation on said shaft means and generating alternating Faraday current signals, and conductor means threaded through said hollow shaft means and fixed in ohmic contact with one of said electrodes and adapted to conduct said Faraday current signals while minimizing interference or noise, such as generated by said rotating permanent magnet flux;
said magnetic generating means and electrodes being disposed and manipulated symmetrically so as to render said fluid flow signals as a balanced output.

3. The combination as recited in claim 2 further including reference signal means comprising a reference pick-up loop disposed in the transducer and arranged so as to intercept the rotating magnetic flux independent of fluid flow and so provide a reference signal output representing the velocity of flux rotation; together with reference signal processing means adapted to sample said Faraday current signals responsive to said reference signals to thereby provide said fluid flow signals synchronously.

4. The combination as recited in claim 3 wherein said reference signal means is arranged and adapted to provide said fluid flow signal output by a synchronous phasesensitive demodulation of said Faraday signals responsive to said reference signal output.

5. The combination as recited in claim 3 wherein said reference loop is disposed about said rotating permanent magnet, so as to define a prescribed reference plane; wherein said processing means comprises a circuit including a solid-state, synchronous switch means for processing said reference signals and, responsive to changes therein, to gate-out said fluid flow signals synchronous with said reference signals and indicating flow relative to said plane.

6. The combination as recited in claim 5 wherein said transducer includes a protective shell body adapted to house the elements thereof, as well as to streamline the passage of such fluid flow and increase its velocity.

7. The combination as recited in claim 6 wherein said shell body is mounted to project from the hull of a vessel and wherein water-diverting skeg means are arranged in operative relation about this body so as to further increase the velocity of flow therepast, at least relative to said plane, as well as to protect the body.

8. The combination as recited in claim 7 wherein said reference loop establishes said reference plane to be relatively normal to the water flow along the vessel keel, to thereby establish a reference orientation respecting which vessel speed relative to the water may be taken.

9. The combination as recited in claim 6 wherein said electrodes comprise a pair of annular proximate and distal conductors disposed on the periphery of said shell body, symmetrically about the elongate axis thereof, and about said magnet being separated by an annular insulator section such as to maximize the short-circuit leakage path between electrodes.

10. The combination as recited in claim 9 wherein the remote, distal annulus comprises a conductive cap so arranged and adapted as to be projected a few inches from the vessel hull.

11. The combination as recited in claim 6 wherein said permanent magnet comprises a bar magnet adapted to so project magnetic flux out into the fluid flow and sweep it relatively transverse to the flow, at least along said reference plane.

12. The combination as recited in claim 11 wherein is also included, within said shell body, a motor coupled to rotate said hollow shaft and said permanent magnet thereon so as to produce the prescribed Faraday current signals; and is also included an electronics output stage for processing these signals so as to provide a useful velocity indication.

* * * * *